No. 751,981. Patented February 9, 1904.

UNITED STATES PATENT OFFICE.

GEORGE WM. GORDON, OF PHILADELPHIA, PENNSYLVANIA, ASSIGNOR OF TWO-FIFTHS TO HENRY ARZT AND JULIUS SOSTMAN, OF PHILADELPHIA, PENNSYLVANIA.

PROCESS OF PRESERVING WOOD.

SPECIFICATION forming part of Letters Patent No. 751,981, dated February 9, 1904.

Application filed June 20, 1903. Serial No. 162,388. (No specimens.)

*To all whom it may concern:*

Be it known that I, GEORGE WM. GORDON, a citizen of the United States, residing in Philadelphia, Pennsylvania, have invented an Improved Process of Preserving Wood, of which the following is a specification.

My invention relates to certain improvements in processes for preventing the decay of wood, having for its object the provision of a method of treatment by which timber of any desired form may be rapidly and effectively impregnated with a material by which its shrinkage, as well as deterioration or decay, may be prevented for a relatively long period of time.

A further object of the invention is to provide a process of preserving wood employing an ingredient or ingredients which while efficiently performing their function shall be easily obtainable and cheap.

In order to impregnate wood according to my improved process, I thoroughly soak it in lime-water prepared by dissolving lime (calcium oxid) in water, permitting said wood to remain in suitable vats containing such solution until the same has penetrated and saturated every portion thereof. After such teatment I preferably allow the pieces of wood to dry for a suitable time, with the result that a hardening of the fiber takes place. Since lime (calcium oxid) when dissolved in water forms calcium hydroxid, it will be understood that this latter, which is dissolved in water, reaches every part of the vegetable fiber under treatment, so as to be deposited uniformly throughout its structure, and I have found that wood so impregnated resists decay for a period of time very much greater than would otherwise be the case. I have found, further, that it is advantageous to add to the lime-water sugar, and glycerin, either singly or together, preferably in the proportion of one part of lime, one part of sugar, and one-half part of glycerin to thirty-two parts of water.

It will be understood that the above process is equally well adapted for the preservation of all varieties of wood, whether hard or soft, as well as seasoned or unseasoned, the time required for its proper operation depending upon the dimensions of the piece treated as well as its physical condition.

I claim as my invention—

1. The process of preserving wood, the same consisting in soaking it in a solution of calcium hydroxid and glycerin, substantially as described.

2. The process of preserving wood, the same consisting in impregnating the same with a solution containing calcium hydroxid, sugar and glycerin, substantially as described.

In testimony whereof I have signed my name to this specification in the presence of two subscribing witnesses.

GEORGE WM. GORDON.

Witnesses:
M. ELVA NEVILLE,
WILLIAM E. BRADLEY.